United States Patent [19]
Lam

[11] Patent Number: 6,008,732
[45] Date of Patent: Dec. 28, 1999

[54] MOTOR VEHICLE DISPLAY APPARATUS

[76] Inventor: Peter Ar-Fu Lam, 20104 Wayne Ave., Torrance, Calif. 90503

[21] Appl. No.: 08/752,612

[22] Filed: Nov. 19, 1996

Related U.S. Application Data

[62] Division of application No. 07/999,291, Dec. 31, 1992, Pat. No. 5,469,132, which is a division of application No. 08/405,584, Mar. 17, 1995, Pat. No. 5,473,307, which is a division of application No. 08/514,994, Aug. 14, 1995

[60] Provisional application No. 60/007,364, Nov. 20, 1995.

[51] Int. Cl.[6] .................................................... G08B 5/00
[52] U.S. Cl. ............................... 340/815.4; 340/425.5; 340/473; 340/815.46
[58] Field of Search .......................... 340/425.5, 815.4, 340/438, 473, 815.46, 815.54, 573, 469; 362/276, 802, 83.3, 20, 488

[56] References Cited

U.S. PATENT DOCUMENTS

| | | | |
|---|---|---|---|
| 4,430,638 | 2/1984 | Parker | 340/473 |
| 4,952,910 | 8/1990 | Straten et al. | 340/473 |
| 4,972,172 | 11/1990 | McLaughlin | 340/331 |
| 5,016,145 | 5/1991 | Singleton | 362/80.1 |
| 5,126,926 | 6/1992 | Wen | 362/83.3 |

FOREIGN PATENT DOCUMENTS

268338  5/1988  European Pat. Off. .

*Primary Examiner*—Jeffery A. Hofsass
*Assistant Examiner*—Julie Lieu

[57] ABSTRACT

Display apparatus (20) is configured to be plugged into the cigarette lighter socket of a vehicle. LEDs 37 and control circuit 36 are configured to provide a gently blinking display mode to enhance the driving pleasure at night. In case of emergency, switch 34 triggers the LEDs 34 to provide high intensity blinking warning light. Batteries (24, 25, 26) provide power to the apparatus when it is detached from the cigarette lighter socket of the vehicle.

30 Claims, 8 Drawing Sheets

MOTOR VEHICLE DISPLAY APPARATUS

RELATED APPLICATIONS

This is the regular patent application corresponds to the provisional patent application Ser. No. 60/007,364 filed Nov. 20, 1995. This is also a divisional of U.S. Pat. application Ser. No. 07/999,291 filed Dec. 31, 1992, now U.S. Pat. No. 5,469,132 issued Nov. 21, 1995, U.S. patent application Ser. No. 08/405,584 filed Mar. 17, 1995, now U.S. Pat. No. 5,473,307 issued Dec. 5, 1995 and pending U.S. patent application Ser. No. 08/514,994 filed Aug. 14, 1995, which are incorporated herein by reference.

FIELD OF THE INVENTION

The present invention relates to display apparatus in used with motor vehicles for energizing light transducer in response to external perturbations; said display apparatus is also desirable to be detached from the motor vehicle and to be used as a portable warning signal lighting apparatus by night time.

BACKGROUND OF THE INVENTION

Traditional transducer apparatus derives power from a battery source and requires an on/off switch to control the power supplied to the apparatus. The objective of the invention is to develop an automobile display apparatus to derive power from the cigarette lighter and for the power of the display apparatus to be switched on and off according to the motion and ambient light of the vehicle. A further objective of the invention is to design the display apparatus such that it can be detached from the motor vehicle and to be used as a portable warning signal lighting apparatus by night time.

SUMMARY OF THE INVENTION

The present invention is directed to the power supply structure of a display apparatus producing an electrically generated lighting effect. The power supply of the apparatus is derived from battery or connected to the cigarette lighter socket of an automobile. A light sensitive component is installed to switch on or off the apparatus according to the optical signal picked up. The display portion of the apparatus can be a panel selected from a variety of graphic design, three dimensional design, words, phrases and picture design; or to be used as a photo frame. A pattern generator enables the display apparatus to generate different lighting effect patterns and with different intensity. Another important preferable feature is to include an emergency signal mode enabling the display apparatus to be detached from the motor vehicle and to be used as a portable warning signal lighting apparatus by night time.

Embodiments of the invention are particularly suited for use, for example, display apparatus in automobiles to produce lighting effects to enhance driving pleasure at night. With a motion sensor, the apparatus is maintained in a switch-on position when the car is in motion. The motor vehicle motion sensor can be a mechanical inertia sensor or an electrical sound detection sensor which picks up the continuous running engine sound conducted through the body of the vehicle to the sound detection sensor. When a light sensor is equipped, the display apparatus can be automatically switched on when a predetermined darkness level is detected by the optical sensor. The power of the device is automatically switched off when the car is not in motion or in day time. When the display apparatus is detached from the motor vehicle, an internal battery which stores energy enables the display apparatus to be switched into a emergency signal mode suitable for end users to signal the near by traffic at night time. This is an useful feature for motor vehicle driver to safely walk to an emergency phone when the motor vehicle broke down on a highway at night. As compared with the normal decoration display mode, the emergency signal mode is desirable to be switched to an eye catching flickering pattern together with a higher light intensity. The increase in intensity can be achieved by increasing the power delivered to the light transducer or by focusing the light beam.

DESCRIPTION OF THE PREFERRED EMBODIMENTS

Figure 1:
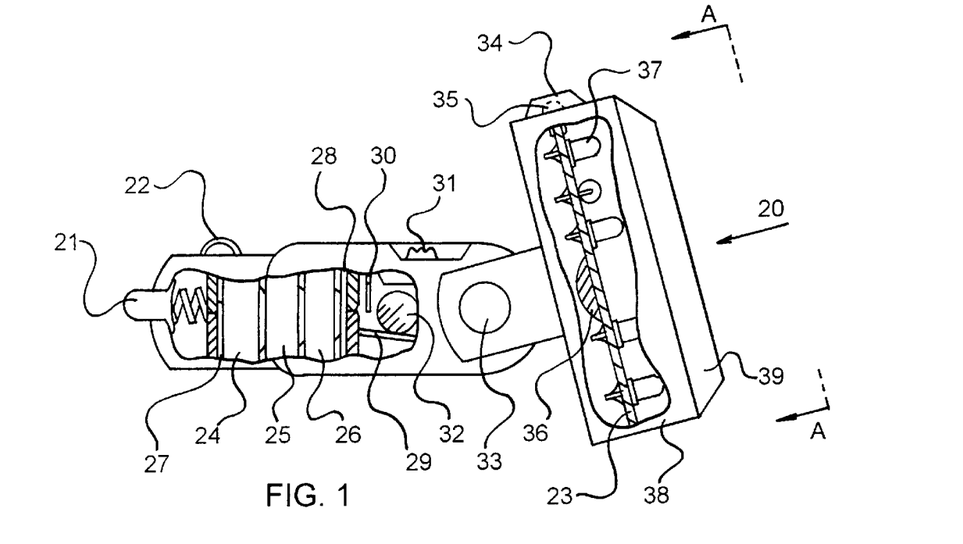
FIG. 1 is a sectional elevation view of a first embodiment of the present invention.
Figure 2A:
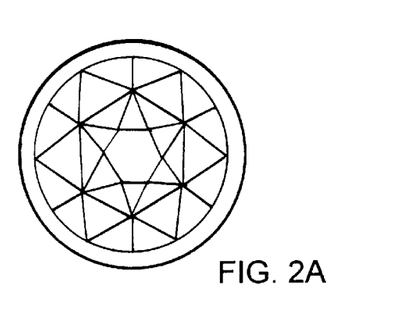
FIG. 2A is a view of projection AA.
Figure 2B:
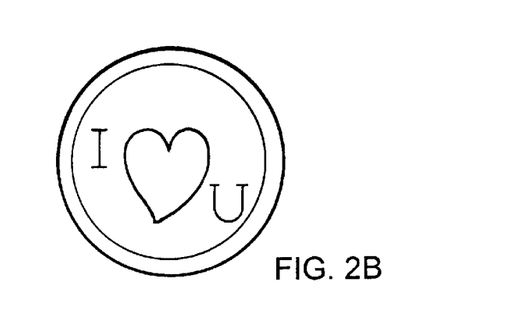
FIG. 2B is another view of projection AA.
Figure 2C:
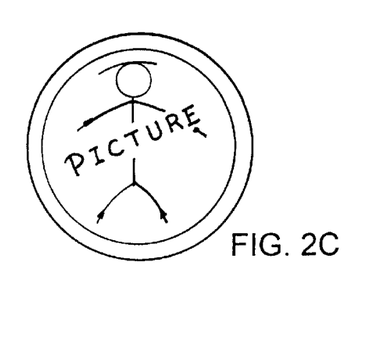
FIG. 2C is another view of projection AA.
Figure 2D:
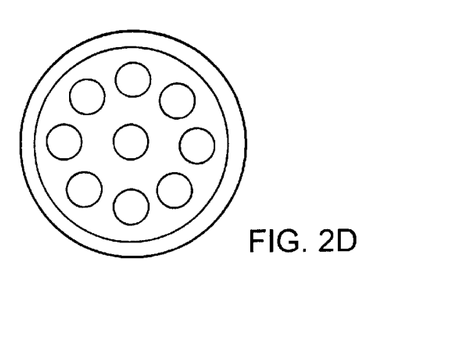
FIG. 2D is another view of projection AA.

A preferred embodiment 20, in accordance with the present invention, of a display apparatus in use with a motor vehicle is illustrated in the elevation view of FIG. 1. The display apparatus comprises of electrical contacts 21 and 22 to conduct 12 V power from the motor vehicle; batteries 24, 25 and 26 to provide power to the apparatus when it is detached from the motor vehicle; emergency mode switch 31 which is normally not accessible to end user unless the apparatus is detached from the motor vehicle cigarette lighter; display module 38 which can be pivoted with the cigarette lighter adapter portion along the hinge 33 and the motion sensor comprises of the contacts 29, 30 and the metal ball 32. The display module 28 comprises of a an internal printed circuit board (PCB) assembly 23. 36 is the chip on board controller integrated circuit. One or more pre-focused light emitting diodes (LEDs) 37 are attached on the appropriate locations of the PCB assembly to generate the lighting effect. The LEDs can also be of chip on board type; that is, the LEDs are directly bonded onto the PCB. The display apparatus can be triggered by pushing the manual trigger switch 34. Light sensor 35 gives an optional feature enabling the display apparatus to be automatically turned on only during night time. The front portion of the display apparatus 39 can be a fixed decoration part, a factory assembled decoration part, or an user selectable and assembled decorative panel. FIG. 2A shows an embodiment of the decoration part in the shape of a symmetrically shaped diamond. FIG. 2B is another embodiment showing graphic patterns and letters; alternatively, different words or phrases can also be displayed. FIG. 2C is another embodiment showing pictures. The decoration portion 39 can be structured to hold photographs or slides. FIG. 2D shows a transparent cover such that the arrangement of the LEDs forms the decoration pattern. The length of the cigarette adapter portion is preferably to be adjustable.

Figure 3A:
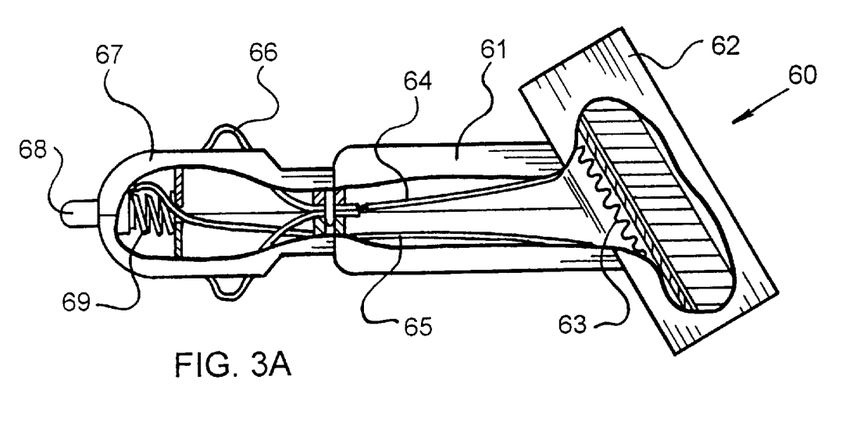
FIG. 3A is an embodiment showing the structure of a motor vehicle cigarette lighter adapter.
Figure 3B:
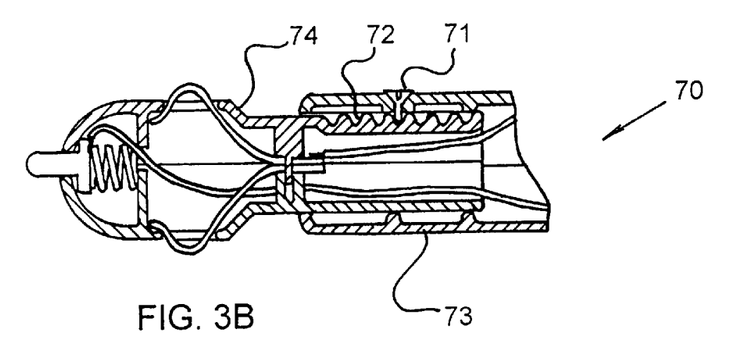
FIG. 3B is a sectional view of 3A showing the structure of an adjustable length motor vehicle cigarette lighter adapter.
Figure 3C:
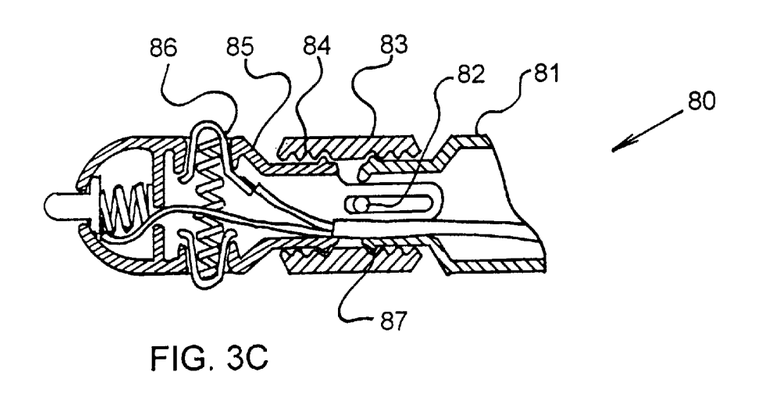
FIG. 3C is a sectional view of another adjustable length motor vehicle cigarette lighter adapter.

FIG. 3A shows another embodiment such that the display module additionally comprises a structure to generate air freshner. In addition of the heat transducer 63, the display module may additionally comprise of a sound transducer and/or motion transducer to enhance the display features of the invented apparatus. FIG. 3B shows a sectional view of an embodiment wherein the cigarette adapter portion is of adjustable length to suit for different cigarette lighter socket and panel design. The portion 73 is adjustable relative to the tip portion 74 and the adjusted length is fixed by the location screw 71 mated with the positioning recesses 72. FIG. 3C is another alternate embodiment of the adjustable length cigarette lighter adapter. When the sleeve 83 is rotated, the tip portion 85 and the display end 81 moves in opposite direction and the length of the cigarette lighter adapter is altered.

Figure 4:
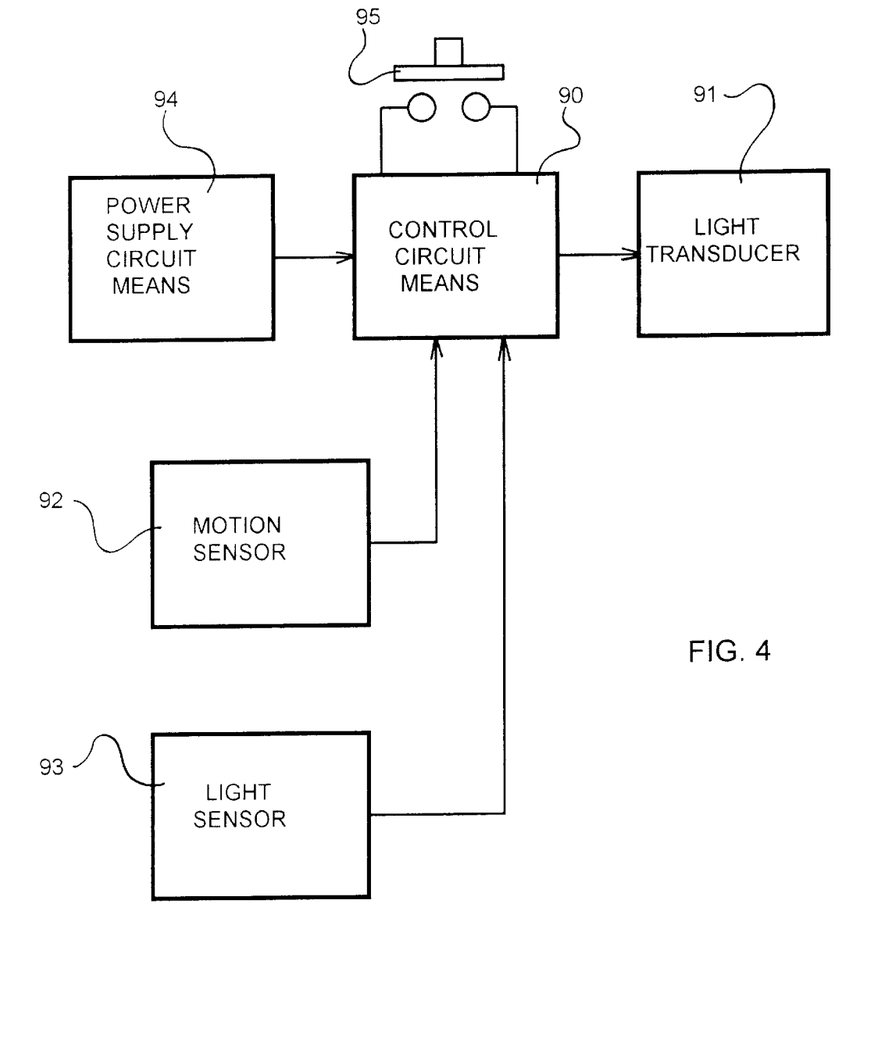
FIG. 4 is the block diagram of a preferred embodiment.

FIG. 4 shows the functional block diagram of the preferred embodiment. The Power supply circuit means 94 performs several functions. Firstly it directs the 12 V of the motor vehicle to the circuitry. Secondly it reduces and/or regulate the 12 V to a lower voltage required by the working circuitry. Thirdly, it charge up an internally rechargeable battery, an energy storage device which power the display apparatus when it is detached from the motor vehicle. Fourthly, it governs the switch over of power supply from the motor vehicle power source to the internal battery when the display apparatus is removed. It should be noticed that if non-rechargeable battery is to be installed into the display apparatus, the charging circuit is not required. The control circuit means receives control signals from the manual switch 95, motion sensor 92 and light sensor 93; accordingly the control circuit means turns on and off each light transducer element to provide a desirable display effect. Different flickering patterns and display intensity of the light transducer is also controlled by the control circuit means.

Figure 5:
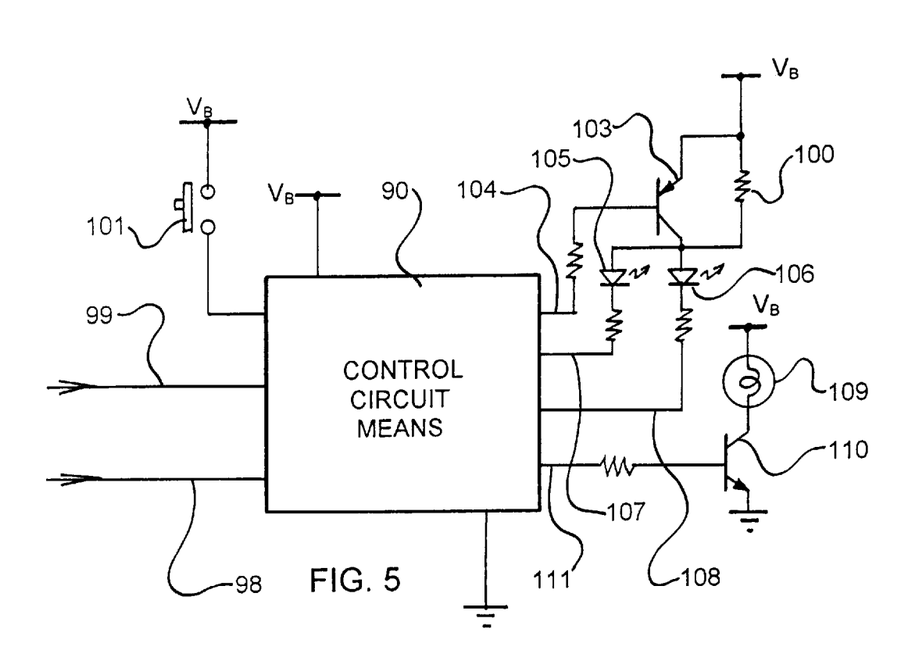
FIG. 5 is another preferred embodiment showing different light transducers.

FIG. 5 shows how the control circuit means is interfaced with typical light transducers. LEDs 105 to 106 are turned on and off according to the driver lines 107 to 108 derived from the control circuit means 90. When driver line 104 goes low, transistor 103 is turned on and short circuit resistor 100. As a result, higher current flows through the LEDs which are turned on and the light intensity emitted by the LEDs is increased. High light intensity is important when the display apparatus to be switched into the emergency signal mode. Alternatively, the control circuit means 90 may turn on and off a light bulb 109 through a driver transistor 110. When the LEDs are mounted onto the PCB in a chip on board method, a focusing front plate look similar to FIG. 2D helps to focus the light beams of the LEDs.

Figure 6:
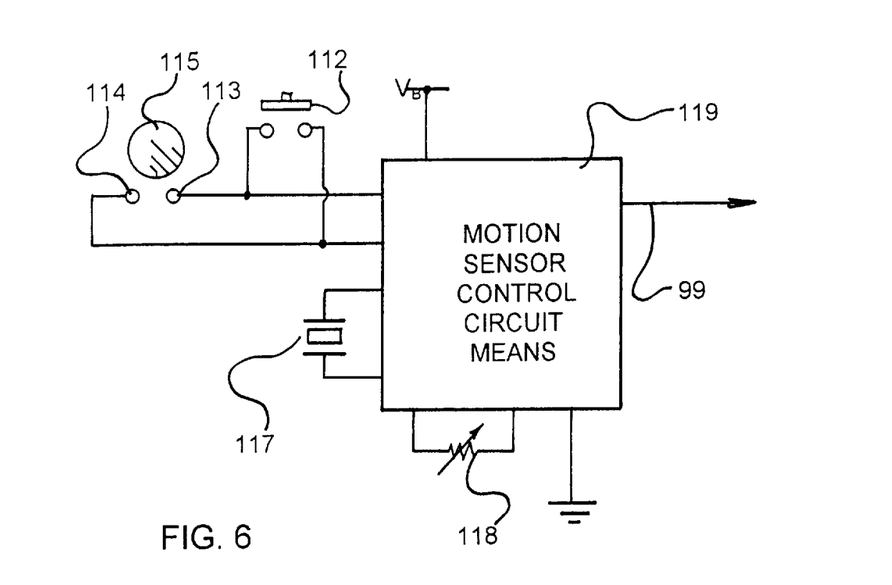
FIG. 6 is a preferred embodiment of the motion sensor.
Figure 9A:
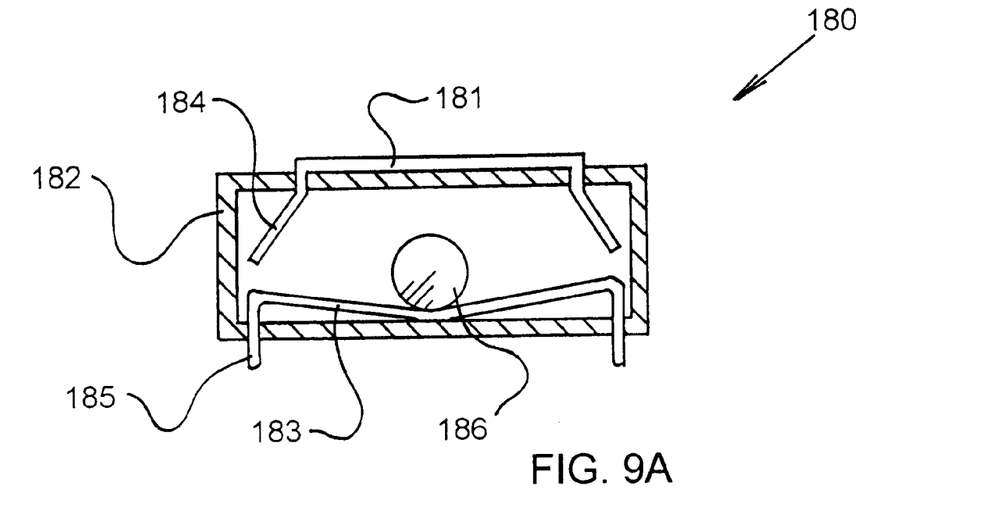
FIG. 9A is a sectional elevation view of another embodiment of the motion sensor.
Figure 9B:
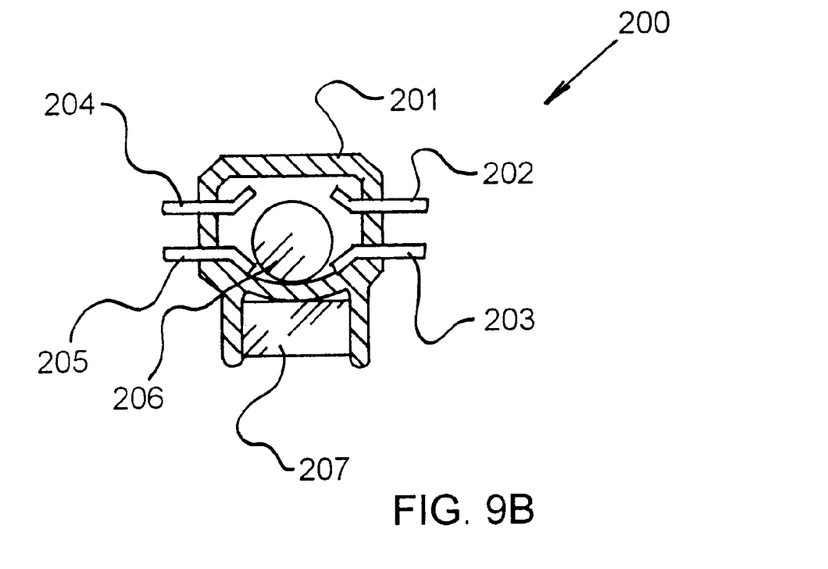
FIG. 9B is a sectional elevation view of another embodiment of the motion sensor.

It is a desirable feature for the standby current of the display apparatus to be of insignificant value so as not to drain down the battery of the motor vehicle. The light display effect is preferable to be turned on only when the motor vehicle is occupied and turned off automatically when it is vacant. To achieve this design objective, a low standby current electronic design is required and a motion sensor is desirable to turn off the light display effect when the motor vehicle is not running for a predetermined period of time. FIG. 6 discloses a typical motion sensor arrangement. Whenever a motor vehicle is in motion, the metal ball 115 of a typical motion sensor makes contact with terminals 113, 114 and initiates a trigger signal to be sent to the control circuit means through signal path 99 of FIG. 5 and FIG. 6. Typical embodiment of motion sensor making use of a metal ball is shown in FIG. 9A and FIG. 9B. A manual button is desirable to operate in parallel with the contact terminals 113 and 114 for manual trigger of the display apparatus. Alternative, a manual trigger button 101 can be connected directly to the control circuit means as shown in FIG. 5. When designing the electronic circuit to work with a contact type motion sensor, great care is required to limit the standby current to an insignificant value when the contact terminals is always in contact. This may happen when the motor vehicle is parked on a slope.

Figure 8A:
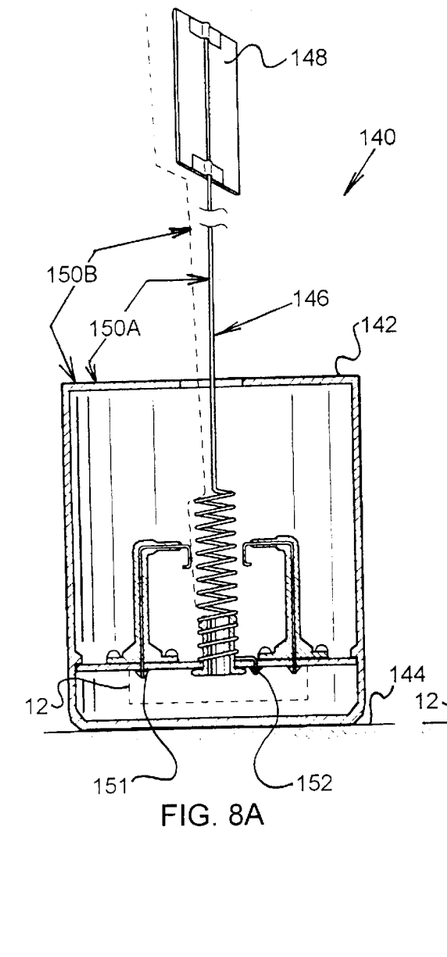
FIG. 8A is a sectional elevation view of an embodiment of a motion sensor.
Figure 8B:
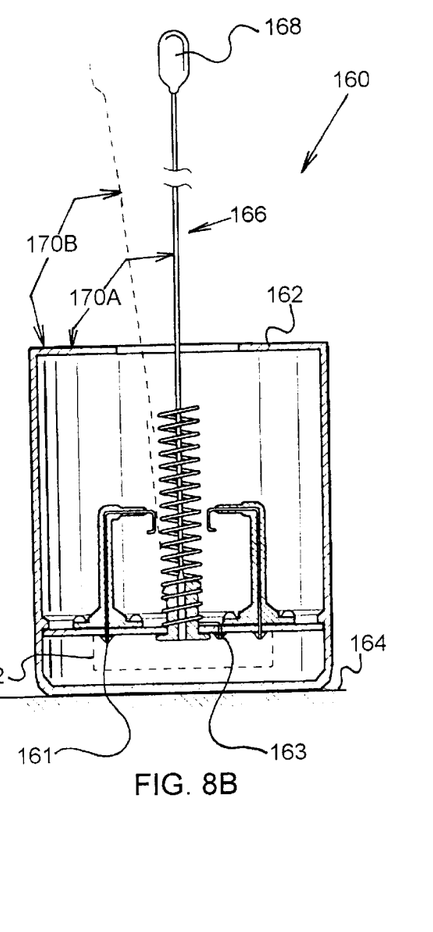
FIG. 8B is a sectional elevation view of an alternate embodiment of a motion sensor.

When a motor vehicle is riding on a smooth highway for an extended period of time, acceleration and deceleration may not happen frequent enough to maintain consistent retriggering of a lower sensitivity version of mechanical motion sensor such as those shown in FIG. 8, FIG. 9A and FIG. 9B. An electrical motion sensor is designed to overcome this design difficulty. The sound detection device 117 of FIG. 6 picks up the sound of the engine and the bumps of the road and initiates trigger signal to the control circuit means 90 through signal path 99. The sensitivity of the electrical motion sensor can be adjusted by an adjustment component 118 which qualify how an electrical signal received from the sound detection device 117 is to be accepted or ignored. Typical example of the sound detection device 117 is piezo transducer and condenser mic. The piezo transducer is usually of much lower standby current but is responsive to a narrow frequency band. A condenser mic is responsive to a broader frequency band but requires a biasing circuit and an amplifier circuit which consumes relatively higher standby current. When a higher current motion sensor such as a condenser mic is used, it is desirable to have a manual trigger switch 101 to turn on the power of the motion sensor and start up the light display effect as long as signal is continuously received by the motion sensor. The power of the circuitry will be turned off automatically when no qualified signal is received for a specified period of time. To turn on the power again requires the manual switched to be retriggered again.

Figure 7:
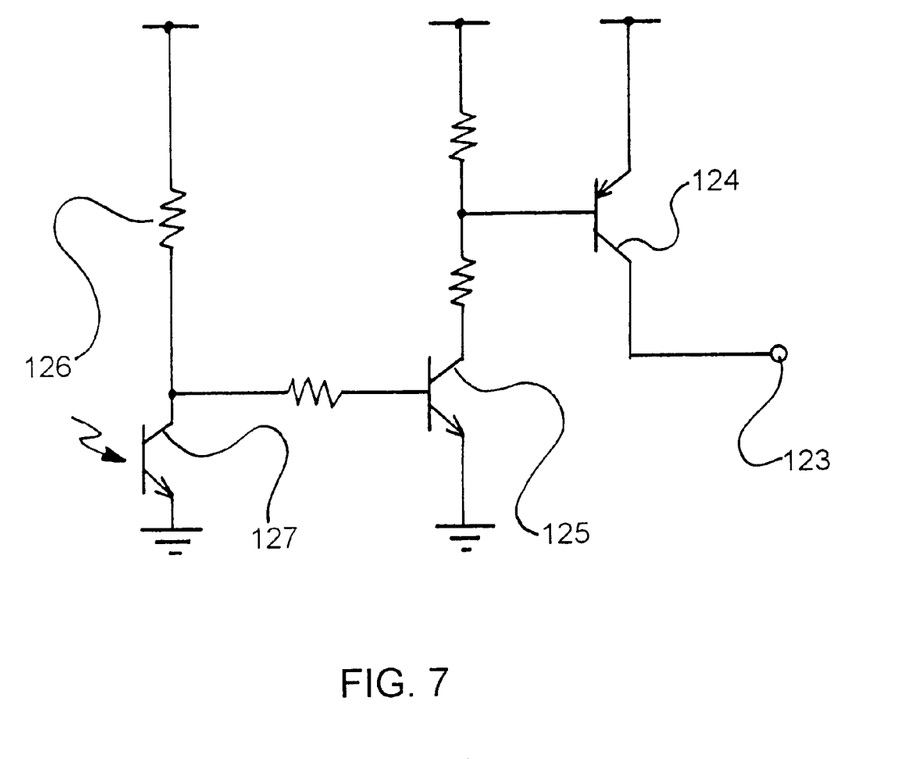
FIG. 7 is a circuit diagram of an embodiment of the light sensor.

It is a desirable feature of the display apparatus when a signal is received from the motion sensor, the light display effect is automatically turned on only during night time, a light sensor is desirable to measure the ambient light of the motor vehicle and enables the light display effect only when the ambient light is lower than a specified level. FIG. 7 discloses the schematic diagram of a light sensor. When the light sensor 127 picks up sufficient amount of light, it is saturated and transistors 125 and 124 are turned off. At night, the light level drops to a low level and the light sensor 127 is cut off. Current flowing through resistor 126 turns on transistors 125 and 124 and eventually the output terminal 123 is switched to a logic high level to enable the control circuit means to turn on the light display effect.

FIG. 8B is an embodiment of a motion sensor. When a motor vehicle is in motion, the inertia of the weight 168 causes the elongated member 166 to be displaced from position 170A to position 170B and causes the terminals 161 and 163 to make contact which in turn triggers the control circuit means. FIG. 8A shows an alternate embodiment of FIG. 8B except that the weight 148 forms as an integral part with the helical spring which returns the weight to the neutral non-triggering position. FIG. 9A shows another alternate embodiment of the motion sensor making use of a metal ball 186 to contact terminals 184 and 185 when the motor vehicle is accelerated or decelerated. The concave shape of the contact plate 183 enables the metal ball to return to the neutral unconnected position when the motor vehicle is not in motion and stayed in a level position. It should be noticed that the concave shape contact plate is not a necessary design feature when the standby current is designed to stay at a low level even when the contact terminals 184 and 185 are making contact together. FIG. 9B discloses an alternate embodiment of FIG. 9A except that the neutral level position of the ferromagnetic metal ball 206 is maintained by a permanent magnet 207.

Figure 10A:
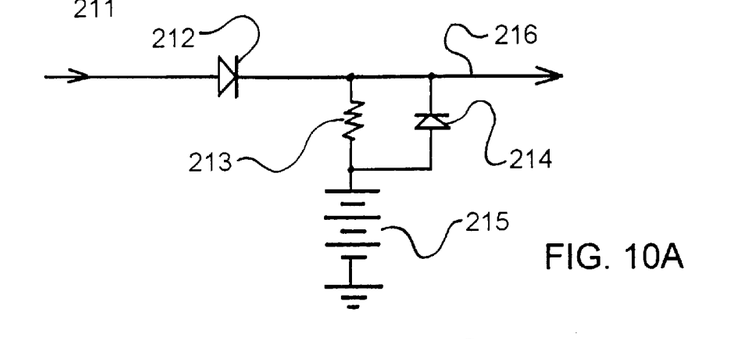
FIG. 10A is a circuit diagram of an embodiment of the power supply circuit means.
Figure 10B:
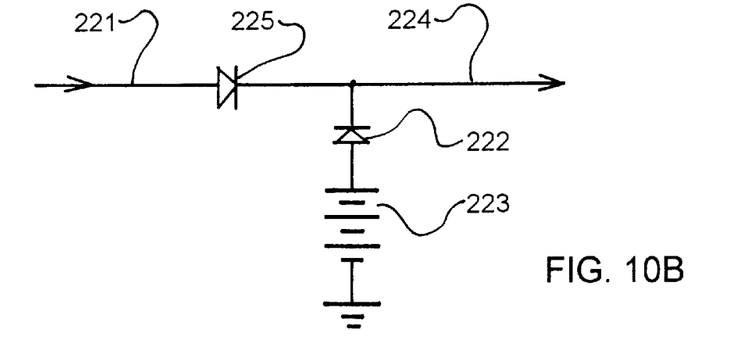
FIG. 10B is a circuit diagram of another embodiment of the power supply circuit means.
Figure 10C:
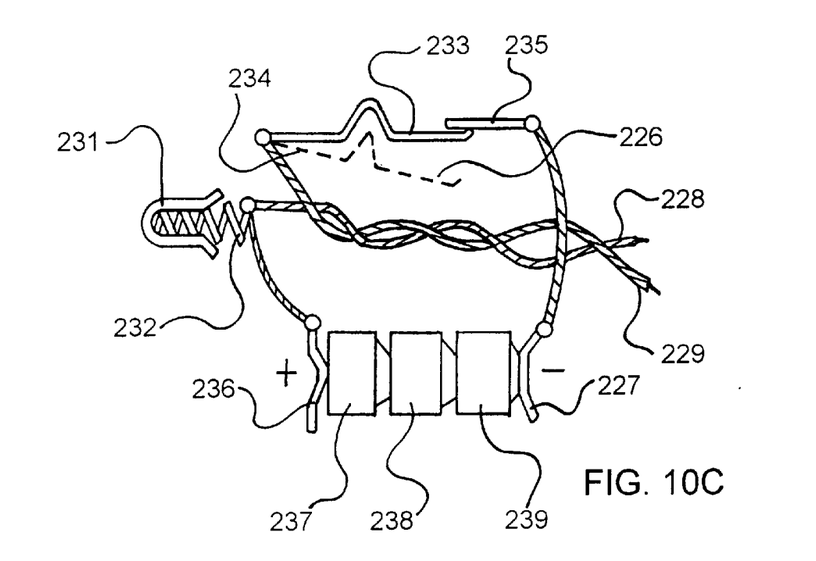
FIG. 10C is a circuit diagram of another embodiment of the power supply circuit means.

An important feature of a preferred embodiment is to enable the display apparatus to be detached from the motor vehicle and to be used as a portable warning signal lighting apparatus by night time. This requires an internal energy storage device such as a battery to power the display apparatus when the motor vehicle power source is removed. FIG. 10 B shows a design to serve the purpose. Motor vehicle power which is of higher voltage than the internal battery 223 is feeding through path 221, 224 to the circuitry of the display apparatus. Diode 222 is normally reverse biased and turns off the power path connected to the battery 223. When the display apparatus is disconnected from the motor vehicle, diode 222 is forward biased and the internal battery 223 starts to feed power to the circuitry through path 224. Diode 225 protects the internal battery to be loaded when the surge of the motor vehicle power source which may occur when the engine of the motor vehicle is started. FIG. 10A is an alternate embodiment of FIG. 10B except the internal energy storage device is a rechargeable battery. Resistor 213 provides a current path to charge up the internal battery by the motor vehicle power source. The resistance of the resistor is to be of high value to trickle charge battery at a slow rate because the battery may be connected to the motor vehicle power source for an extended period of time. FIG. 10C discloses a mechanical alternative of the embodiment shown in FIG. 10A. When the display apparatus is inserted into the cigarette lighter socket, the spring contact 233 is moved to the position 226 and disconnected from the terminal 235 which is wired to the negative terminal 227 of the internal batteries 237, 238 and 239. Power of the motor vehicle is obtained from the terminals 231, 233 and delivered to the circuitry through the wire pairs 228 and 229. When the display apparatus is detached from the motor vehicle cigarette lighter, spring contact 223 is in contact with terminal 235 and the internal battery terminals are connected to the wire pairs 228, 229 to automatically initiate the emergency mode.

It should be noted that various modification of the embodiment is possible. The internal battery may be positioned inside the display module 38 of FIG. 1. The display module may also be detachable from the cigarette lighter adapter portion with a connector. Alternatively, the display portion may be connected to the cigarette lighter adapter portion by a cable so that the user has more freedom to position the display unit. Further modification of the invention is to have the display apparatus to be a self contained unit with internal battery and the battery can be recharged through a detachable cable/adapter connected to the power source of the motor vehicle.

The preferred embodiments of the invention described herein are exemplary and numerous modifications, dimensional variations and rearrangements can be readily envisioned to achieve an equivalent result, all of which are intended to be embraced within the scope of the claims to be submitted in the regular patent application to be followed.

I claim:

1. A display apparatus useful in combination with a vehicle comprising:

power plug dimensioned to plug into the cigarette lighter socket of a vehicle and to receive power from said vehicle;

light transducer configured to provide at least a first high intensity mode and a second lower intensity mode; and said light transducer is further configured to be operative to provide said high intensity mode when said power plug is removed from the cigarette lighter socket of the vehicle.

2. The apparatus of claim 1 wherein the higher light intensity of said first mode is obtained by optically focusing the light transmitted by said light transducer.

3. The apparatus of claim 1 wherein the higher light intensity of said first mode is obtained by delivering higher power to said light transducer.

4. The apparatus of claim 1 further comprising electronic circuit means to provide different visual display in between said first mode and said second mode.

5. The apparatus of claim 4 wherein said light transducer comprises of one or more light emitting devices and said electronic circuit means is configured to provide at least one blinking pattern to said light transducer.

6. The apparatus of claim 1 further comprising energy storage device to power said apparatus when it is detached from the vehicle.

7. The apparatus of claim 6 wherein said energy storage device is rechargeable.

8. The apparatus of claim 1 further comprising a motion sensitive device to turn on said light transducer when the vehicle is in motion.

9. The apparatus of claim 1 further comprising a sound sensitive device to turn on said light transducer when the sound level received exceeds a predefined level.

10. The apparatus of claim 1 further comprising a light sensitive device to turn on or off said light transducer when the ambient light exceeds or below a predefined level.

11. The apparatus of claim 1 further configured with means to automatically switch said apparatus to the first mode when said power plug is detached from the cigarette lighter socket of the vehicle.

12. The apparatus of claim 7 further comprising circuit means to charge said energy storage device when said power plug is connected to the power of said cigarette lighter socket and to connect the power of said energy storage device to the light transducer when said power plug is detached from said cigarette lighter socket.

13. A sound sensitive trigger circuit means for use in an apparatus to be plugged into the cigarette lighter of a vehicle having an engine, comprising an engine sound sensitive device mounted to receive the engine sound of said vehicle, said circuit means further be configured to differentiate the characteristics of said engine sound,     contact terminals dimensioned to receive power from said cigarette lighter of the vehicle; and     control circuit means to generate a trigger signal according to the sound signal received by said sound detection device.

14. The sound sensitive trigger circuit means of claim 13 wherein said trigger signal is to turn on a light transducer equipped in said apparatus.

15. An apparatus configured to be useful inside a vehicle comprising:

a power plug to plug into the cigarette lighter socket of a vehicle and to receive power from said vehicle; said power plug defines a first power source derived from the vehicle;

energy storage means to define a second power source;

a light transducer configured to be operable while said vehicle is running and to receive power from at least one of said power sources;

switchinig circuit means to deliver power from the vehicle to said light transducer when said apparatus is attached to the cigarette lighter socket of the vehicle and to deliver power from said energy storage means to said light transducer which said apparatus is detached from the cigarette lighter socket; and     said light transducer is further configured to provide at least two different lighting modes and said switching circuit means is further configured to switch the light transducer from a first lighting mode to a second lighting mode.

16. The apparatus of claim 15 wherein said switching circuit means automatically deliver power from said energy storage means to said light transducer when said apparatus is detached from the cigarette lighter socket.

17. The apparatus of claim 15 wherein said switching circuit means is automatically set to said second lighting mode when said apparatus is detached from the cigarette lighter socket.

18. The apparatus of claim 15 wherein said first lighting mode is a decorative mode to enhance the driving pleasure at night.

19. The apparatus of claim 15 wherein said second lighting mode is a panic mode to generating an alert lighting signal at night.

20. The apparatus of claim 15 wherein said sound lighting mode is of higher intensity than said first lighting mode.

21. The appartus of claim 15 further comprises a translucent picture.

22. A decorative display apparatus configured to be useful inside a vehicle comprising:

power plug to plug into the cigarette lighter socket of a vehicle and to receive power from said vehicle; said power plug defines a first power source derived from the vehicle;

a second power source, a light transducer configured to be operable while said vehicle is running having at least a first lighting mode and a second different lighting mode; and     said first power source is configured to light up said first lighting mode and said second power source is configured to light up said second lighting mode.

23. The apparatus of claim 22 wherein in said second lighting mode is of higher intensity than said first lighting mode.

24. The apparatus of claim 22 further comprise a translucent picture and a picture frame mounting said translucent picture to said apparatus.

25. The apparatus of claim 22 further comprising a detachable translucent picture.

26. An apparatus configured to be useful inside a vehicle comprising:

light transducer means to provide at least first and second modes of lighting;

rechargeable energy storage means to power said light transducer means when said apparatus is detached from the vehicle cigarette lighter socket;

a power plug dimensioned to plug into the cigarette lighter socket of the vehicle and to deliver power from the vehicle to charge said energy storage means;

first circuit means configured to drive said light transducer means to deliver a visual effect; and     second circuit means initiated by the removal of said apparatus from the cigarette lighter socket to automatically start the second mode of lighting without any other user intervention.

27. The apparatus of claim 26 wherein said second mode is a panic mode configured to provide emergency lighting signal at night.

28. The apparatus of claim 26 wherein said first mode is configured to provide a decorative lighting effect to enhance the driving pleasure at night.

29. The apparatus of claim 26 wherein said first mode is when said light transducer means is off.

30. The apparatus of claim 26 wherein said first and second modes provide different visual lighting effects.

\* \* \* \* \*